F. N. DARST.
WAGON JACK.
APPLICATION FILED MAY 8, 1917.

1,300,129.

Patented Apr. 8, 1919.

WITNESSES
James F. Crown,
L. B. Middleton

INVENTOR
Fred N. Darst,

BY Richard Bowen,

ATTORNEY

UNITED STATES PATENT OFFICE.

FRED N. DARST, OF LOVILIA, IOWA.

WAGON-JACK.

1,300,129.  Specification of Letters Patent.  Patented Apr. 8, 1919.

Application filed May 8, 1917. Serial No. 167,289.

*To all whom it may concern:*

Be it known that I, FRED N. DARST, a citizen of the United States, residing at Lovilia, in the county of Monroe and State of Iowa, have invented certain new and useful Improvements in Wagon-Jacks, of which the following is a specification.

This invention relates to new and useful improvements in wagon jacks and the principal object of the invention is to provide a device of this character with means for engaging with the wheel of a vehicle to move the same on its axle to allow said axle to be greased.

Another object of the invention is to provide the jack with vehicle wheels so the same with the wheel thereon may be easily moved away from the axle.

A further object of the invention is to provide means for engaging a vehicle wheel at a point on each side of where it rests on the ground, so that the jack may be engaged with the wheel without necessitating the adjustment of any part thereof.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 1:
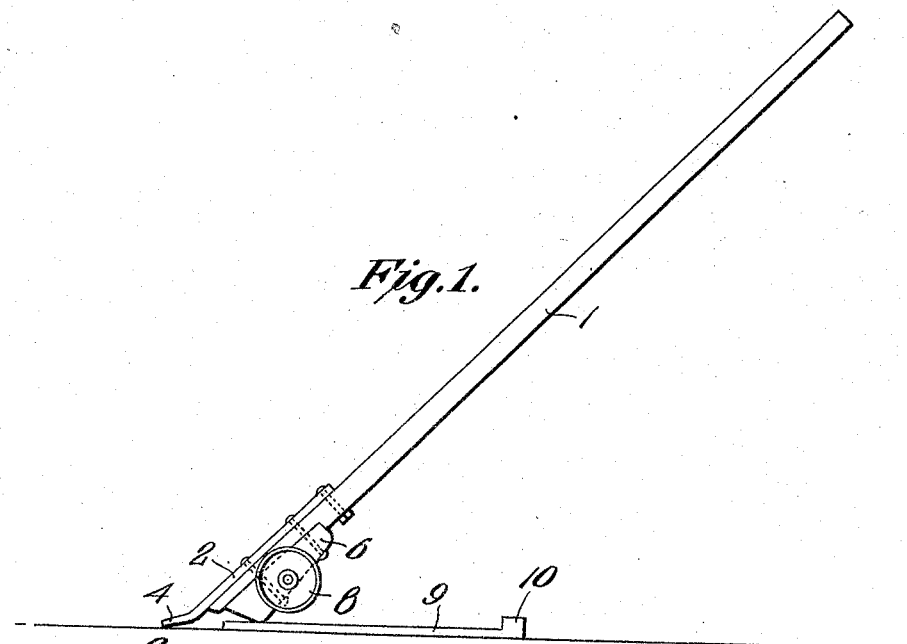
Figure 2:
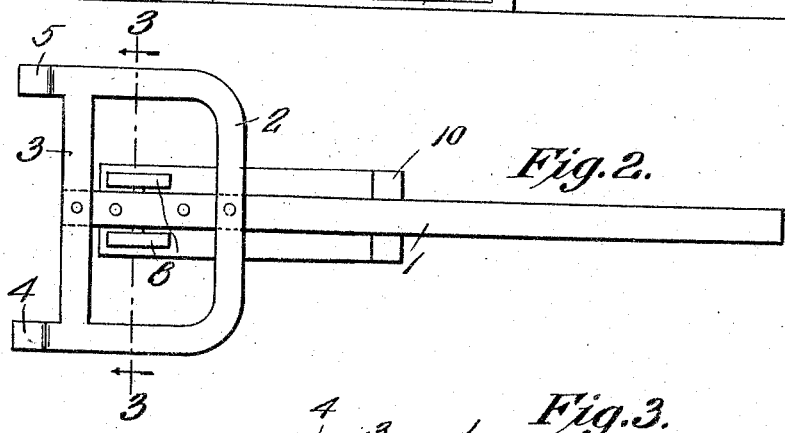
Figure 3:
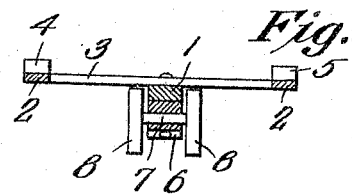

Figure 1 is a side view of the jack in a position to engage with the wheel of a vehicle, Fig. 2 is a plan view, and Fig. 3 is a section on line 3—3 of Fig. 2.

In these figures 1 indicates the handle part and 2 indicates a substantially U-shaped member having a cross bar 3 adjacent its free end and this bar together with the base of the U are secured to the handle by bolts or any other suitable means. The cross bar 3 is flush with the end of the handle and the free ends of the U indicated by the numerals 4 and 5, extend beyond the said cross bar and are bent upwardly, as indicated in Fig. 1. To the underside of the handle adjacent its lower end, I secure a substantially wedge shaped block 6 by bolts or the like with its large end lowermost, and through this block is mounted an axle 7 projecting on each side thereof and to which the wheels 8 are secured. The lower end of the block projects beyond the circumference of the wheels as shown in Fig. 1 and its corner constitutes a fulcrum for the lever. 9 indicates a plank of sufficient width to form a track for the wheels and it has a projection 10 at its end to prevent the wheels from running off.

When it is desired to lubricate a vehicle axle the track 9 is placed to one side of the vehicle wheel and the jack is placed with its ends 4 and 5 engaging the rim of said wheel on each side of the point where it touches the ground. In this position of the jack the lowermost corner of the block 6 will rest on the track 9 and form a fulcrum for the jack. Then, when the handle is lowered the jack swings over said fulcrum so as to raise the vehicle wheel off the ground and in the continued downward movement of the handle, the wheels of the jack engage the track thus lifting the block off the same and acting in their turn as a fulcrum. When the wheels 6 come in contact with the track and the weight shifted from the block to said wheels, the jack with the vehicle wheels may be moved away from the vehicle so as to expose the axle and permitting the same to be lubricated. After this is done, the jack is moved forward to replace the vehicle wheel and tilted upwardly, as in Fig. 1, to place said wheel on the ground, after which the jack can be easily slid from under the vehicle wheel and placed in position to raise another.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:—

The herein described lifting jack comprising a lever, a U-shaped member secured upon its lower end and having the ends of the U projecting beyond such lower end, a triangular block secured beneath the lever with its larger end downward and its angle constituting a fulcrum, a rod through said block, and wheels on the extremities of said rod disposed to be above the ground when the fulcrum touches the same, the whole for use as described.

In testimony whereof I affix my signature in presence of two witnesses.

FRED N. DARST.

Witnesses:
D. J. DARST,
C. R. DAY.